(12) United States Patent
Bommi et al.

(10) Patent No.: US 7,396,461 B2
(45) Date of Patent: Jul. 8, 2008

(54) FILTER CARTRIDGE FOR GRAVITY-FED WATER TREATMENT DEVICE

(75) Inventors: Govind Bommi, Bayshore Park (SG); Krishna Murthy Bommi, Bangalore (IN)

(73) Assignee: Filtrex Holdings PTE, Ltd., Parklane Mall (SG)

( * ) Notice: Subject to any disclaimer, the term of this patent is extended or adjusted under 35 U.S.C. 154(b) by 319 days.

(21) Appl. No.: 11/277,004

(22) Filed: Mar. 20, 2006

(65) Prior Publication Data
US 2007/0215536 A1 Sep. 20, 2007

(51) Int. Cl.
*C02F 1/28* (2006.01)
*C02F 1/42* (2006.01)

(52) U.S. Cl. ............ 210/266; 210/282; 210/317; 210/464; 210/484; 210/489; 210/502.1; 210/506; 210/510.1

(58) Field of Classification Search ............ 210/266, 210/282, 317, 464, 469, 484, 489, 502.1, 210/506, 510.1
See application file for complete search history.

(56) References Cited

U.S. PATENT DOCUMENTS 5,024,764 A * 6/1991 Holler ............... 210/484
6,004,460 A * 12/1999 Palmer et al. ......... 210/232
6,524,477 B1 * 2/2003 Hughes ............. 210/282

FOREIGN PATENT DOCUMENTS

JP   2002035740 A * 2/2002

OTHER PUBLICATIONS

Derwent Abstract, accession No. 2005-622180 for Indian Patent Publication No. IN 200401421 14, published on Apr. 29, 2004.*

* cited by examiner

*Primary Examiner*—Matthew O Savage
(74) *Attorney, Agent, or Firm*—Levenfeld Pearlstein, LLC

(57) ABSTRACT

A filter cartridge for use in gravity-fed water treatment systems wherein filter elements include a dome-shaped hydrophilic porous particulate carbon powder block filter in a polymeric binder. The filter has a closed upper end and an open lower end with sidewalls extending there between, additional filter media and includes ion exchange resins and a fine mesh hydrophilic filter sheet to reduce contaminant content of water for drinking purposes.

14 Claims, 1 Drawing Sheet

FILTER CARTRIDGE FOR GRAVITY-FED WATER TREATMENT DEVICE

FIELD OF THE INVENTION

This invention relates to filter cartridges for use in gravity-fed water treatment system. In particular this invention relates to novel structural filler cartridge for a carafe/pitcher system. The filter cartridge comprises novel structural components, which are surface modified to increase hydrophilic capacity of the novel structural components to increase water flow rate.

BACKGROUND OF THE INVENTION

This invention relates to a carafe/pitcher water filtration system. More particularly, the instant invention is directed to a batch treatment and filtration device where water is filtered, treated and stored in a container. The treated water is poured from a spigot of the water container which functions as a self-contained water treatment system. These self-contained systems typically have upper and lower chambers separated by a filter cartridge. The water treatment process relies on gravity to force water through the filter cartridge to remove harmful contaminants from the water. The upper chamber receives untreated water to be filtered. The lower chamber receives the filtered water, which is forced through the filter cartridge by gravity.

The presence of unwanted and potentially harmful contaminants in drinking water are a cause for health concern. This concern causes a desire for water treatment devices suitable for use in the home and as portable instruments for water treatment. As a result, many water treatment devices and methods have been developed to remove contaminants or otherwise treat the water to obtain a suitable drinking water.

Some of these water treatment devices and methods utilize treatment materials, which, of their own nature, can be distasteful to consumers of the treated water. For example, municipal water treatment facilities use chlorine as an active agent to remove bacterial contaminants but the odor and taste of the treated water can be offensive to the consumers. It is known to use activated carbon to treat water to remove the offensive odor and taste of chlorine-treated water but flow rate of water through the activated carbon can be hampered.

In addition to chemical and particulate contaminants, several types of harmful contaminants in drinking water are a cause for health concern. Even municipal water treatment fails to adequately remove all of the hazardous contaminates. Most municipal system use chlorine as disinfectant to remove bacteria. It is known that excess chlorine normally used by the municipality is in itself a source to create harmful chemicals commonly known as disinfectant by products, (DBP). These DBP, along with herbicides and pesticides, often present and known as volatile organic chemicals (VOC) are harmful chemicals in the water system. Besides these volatile organic chemical contaminants, biological contaminants including protozoan cysts as Giarida, lamibial and Cryptosporidium, excreted by animals, are present in certain waters.

Cysts are not easily removed by conventional oxidizing agents. Common methods of removing cysts are to trap them in a filter that has porosity less than 2 microns. Such filters with pore sizes less than 2 microns typically are used in water purifier systems that provide high water line pressure.

Gravity filtration is one of the oldest ways of filtering water. Starting from a simple filter cloth to remove suspended impurities to carbon granules along with certain ion exchange media to remove chlorine and certain heavy metals, gravity filtration systems have upper and lower chambers separated by filter cartridge. The system relies on gravity force of the untreated water in the upper chamber to force the water through the cartridge and into the lower chamber thereby producing filtered water. These gravity filtrations systems used in homes vary in sizes, defined by the capacity of the two chambers. One such gravity filtration system commonly used in homes is the carafe type of filter with the top container having a capacity less than 3 liters. The gravity pressure of the untreated water is sufficient to force the water through a limited amount of activated carbon granules and ion exchange resins.

In the prior art, replaceable filter cartridges for household use have been taught and claimed. U.S. Pat. No. 4,212,743 teaches and claims a filter cartridge of particles of activated charcoal and carbon or other suitable absorbent material wherein the cartridge is contained within a housing. Water is filtered by passing it through the tubular wall of the cartridge from the space between the cartridge and the housing toward the outlet or the inside of the tubular cartridge. The filter cartridge is generally cup-shaped. The filter cartridge structure provides a long flow path of approximately seven inches for water traveling from the inlet to the outlet to provide effective odor and taste filtering of the water with a long contact time.

U.S. Pat. No. 3,972,694 teaches and claims a filter tube comprising a plurality of randomly disposed glass fibers having intensities between to define the porosity of the filter. The glass fibers are bonded at the junctions of the fiber cross-overs with a hardened silicone resin bonding agent, the fibers inter-related to form a semi-rigid mass of desired porosity to incorporate an outer absorbent activated carbon-filled filter sleeve. The bonding agent typically may be phenal-formaldahyde or epoxy resins or other thermosetting-type resins. However, the bonding agent can impart hydrophobicity to the filter and restrict the scope of the filter applications in that organic bonding agents can have a color, which darkens with sunlight and use.

U.S. Pat. No. 5,225,078 teaches and claims a pass-through pitcher filter comprising a compact filter element including a thin annular disk of molded granular activated carbon and a peripheral annular seal element. The seal element allows the filter to be replaceably mounted on the lower end of an upper plastic reservoir, which reservoir is adapted to be supported in the top of a pitcher for receiving filtered water. The plastic reservoir for water to be treated and filter are placed on a pitcher for receiving and dispensing the treated water. Such assemblies rely on gravity flow of the water from the reservoir to the pitcher via the filter. The seal element utilizes a synthetic rubber material and is preferably molded around the carbon filter disk. The filter element is made from a rigid sintered block of activated granular carbon. The carbon block is made from granular activated carbon and a suitable binder, such as polyethylene, compressed and heated to form a molded porous block. In the preferred embodiment, a carbon block has a nominal 20-micron porosity and is approximately ½ inch (13 mm) thick and 4¼ inches (5.5 cm) in diameter. An annular synthetic rubber seal is attached to the periphery of the carbon block. The seal may comprise a neoprene-like material. The seal is formed by injection molding around the carbon block. When the filter element is used initially or after it has remained unused for a period of time, surface tension between water in the reservoir which is to be filtered and the dry porous carbon block may inhibit normal gravity flow of the water through the filter element. To initiate flow, manual pressure is applied to the bellows element of the reservoir to compress air in the reservoir to force water through the carbon block to initiate water flow.

In the prior art, U.S. Pat. No. 6,290,848 teaches and claims a filter cartridge for a gravity-fed water treatment device comprising a hydrophilic porous particulate filter having an interior volume filled with an granular filter media comprising granular activated carbon, an ion exchange resin or a combination thereof. The porous particulate filter is microporous, comprises pleated sheet filter media, and is arranged to establish with a pressure of about 0.5 lb./in$^2$ a flow rate of water by gravity through the filter cartridge. The preferred form of carbon of use is granular activated carbon. The preferred granular media for use in the filter cartridge is a mixture of a weak-acid cation exchange resin and granular activated carbon. Such a device has a low flow rate, which is not practical for a gravity fed water treatment device. To overcome this limitation, the porous particulate filter contains hydrophilic material. The porous glass fiber and hydrophilic binder provides water that has 99.95% of 3-5 micron cyst particles removed. However, such a device does not typically remove volatile organic chemicals as not being capable of doing so without specified treating chemicals or materials Other prior art patents disclose procedures and structures relating to portable water filters. U.S. Pat. No. 4,151,092 teaches use of a manual pump to force liquid from a first container through a filter to treat the liquid at a suitable rate. U.S. Pat. Nos. 4,306,971 and 4,969,996 disclose a cup-shaped insert for a granular purifying agent to purify water. U.S. Pat. No. 5,268,093 teaches use of a plunger to force unfiltered water through a filter.

Accordingly, it is an object of this invention to provide a water filter having improved fluid flow as compared with prior art filters.

It is another object of this invention to provide a fluid filter having a removable filter medium adapted for field removal, cleaning, and replacement.

It is another object of this invention to provide a filter capable of removing harmful chemicals known as disinfectant byproducts (DBP) and volatile organic chemicals (VOC) and protozoan cysts.

It is another object of this invention to provide a fluid filler having improved structural characteristics by use of ultra high molecular weight polyethylene as the structural material.

SUMMARY OF THE INVENTION

This invention relates to a gravity fed water filter cartridge comprising a modified structural filter component which effects an increased water flow rate, and removes filter particulates and harmful contaminants from the water to meet NSF 53 standards for treated water as to volatile organic chemicals (VOC) and number of 3- to 4-micrometer particles present in an influent water level per milliliter by at least 99.5%. The structural polymeric binder filter component has surface modification to make the polymeric binder hydrophilic. The filter comprises a polymeric binder of selected dome-shaped small pore size activated carbon blocks of activated carbon powder of mesh size of 80×300 and mesh sizes ranging from 100×280 to 100×320. The wall thickness of the dome-shaped carbon block is in the range of from 3 mm to 10 mm. Ultrahigh molecular weight polyethylene (UHMPE) is the structural polymer component, which does not melt under controlled heat to cover the surfaces of the activated carbon powder particles, yet provide structural strength required for the dome-shaped carbon block to withstand normal use. A hydrophilic filter sheet having porosity of less than 2 microns covers the water exit holes of the filter cartridge shell and provides support for ion exchange resins and other filtering media in the lower portion of the filter cartridge shell. The filter media can include specified chemicals and materials to provide capability to remove volatile organic chemicals and cysts.

DESCRIPTION OF THE PREFERRED EMBODIMENT

Figure 1:
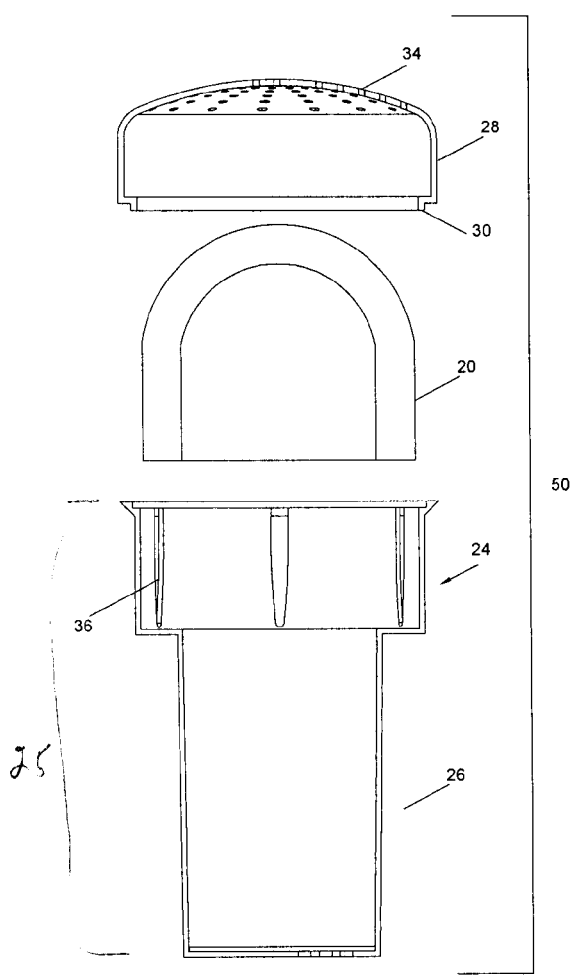
FIG. 1 is a cross-sectional view of the filter cartridge shown as a partial perspective view in FIG. 2.

Activated carbon granules used in home purification devices are used to remove bad taste and odor. They remove chlorine and other reactive chemicals dissolved in the water. Carbon blocks made of activated carbon powder have enormous surface area to remove volatile organic chemicals besides bad taste and odor. Depending on particle size and particle size distribution of carbon particles, carbon blocks filters can be of various nominal porosity.

Conventional carbon blocks are generally tubular in design, and having a central hole, water flows from the outer surface radially through the wall thickness into inner space of the carbon block. For water to flow at an acceptable flow rate through the carbon block, water needs be forced through the thickness of the carbon block. Such systems are generally used in homes with water line connection. For a cysts reduction ability, these carbon blocks have porosity of less than 2 microns. However, in a gravity filter system, particularly the carafe type of filter, conventional shaped tubular carbon block with less than 2 microns porosity will not have adequate gravity force to allow water flow.

In this invention, the carbon block used is not of conventional design but is shaped in the form of a dome wherein water flows through the top and sides of the dome into the inner space of the dome. The flow rate through the dome shape carbon block in this gravity filtration system is a function of water height in the top container, the wall thickness of the carbon block and the porosity of the carbon block. In a carafe type of gravity filtration the water height pressure is typically less than 0.5 lbs/in sq. With this low pressure it is not practical to use a conventional shaped tubular carbon block for it will have an unacceptable flow rate, particularly with smaller porosity.

In this invention the carbon block filter is in a shape of dome to provide higher surface area for water flow. Conventional polymeric binders used in making of carbon blocks are low density polyethylene (LDPE), ethylene vinyl acetate copolymer (EVA), high density polyethylene (HDPE) and ultrahigh molecular weight polyethylene (UHMWPE). The matrix of carbon and polymeric binder in a carbon block filter is hydrophobic in nature with high surface tension preventing easy wetting of the surface.

In this invention the polymeric binder is surface-modified using an anionic surfactant wetting agent. One such wetting agent is diethylhexyl sodium sulfosuccinate, marketed by Uniqema™ with trade name Monowet 70™.

Most commercially available, surfactants used for decreasing surface tension are water-soluble. Monowet 70™ selected in this invention is not water-soluble. Three percent by weight of Monowet 70™ to polymer weight was used in the invention.

The modified surface renders the binder surface hydrophilic. This surface-modified hydrophilic binder increases the attractive force between the binder and water, decreasing the surface tension, allowing faster wetting and hence higher flow rate. Since Monowet 70™ is not water soluble, the surface modified binder remains hydrophilic over an extended period of time as water flows through the carbon block.

This surface modification to make the binder hydrolytic with Monowet 70™ is feasible with all polymeric binders. In this invention the preferred binder used is GUR™, an ultrahigh molecular weight polyethylene (UHMWPE) marketed by Ticona™. Hydrophilic surface-modified binder in the carbon block enables higher water flow rate through the carbon block than without the surface modification. Table 1 shows the flow rate in a carafe application with water height of 5.5 inches high and capacity of 2 liters. The flow rate is higher in the carbon block where the binder was surface modified with Monowet 70™. Table 1 shows higher flow rate was achieved with surface modified binder of carbon mesh size 100×320 irrespective of the wall thickness of the carbon block.

This hydrophilic filter sheet covers over the exit holes and acts as a buffer to trap any escaping cysts not trapped in the carbon block.

The invention accordingly relates to a water filter cartridge with replaceable carbon filter elements for carafe/pitcher applications for home and travel use. The filtration device typically comprises an upper chamber for water to be filtered and treated, a lower chamber to receive the filtered/treated water and a filter cartridge between the two chambers. The upper chamber commonly has a capacity of less than 3 liters. The gravity pressure of the untreated water in the upper chamber is typically less than about 0.5 lb./in². Consequently, to improve flow rate of the gravity-induced flow rate of water which may be inhibited because of surface tension between water to be filtered and the porous carbon block, a hydrophilic additive is surface-applied to the ultra high molecular polyethylene binder of the shaped activated carbon block surface

TABLE 1

| Time for 2 liter flow | 5 mm wall Untreated binder | 5 mm wall treated binder | 10 mm wall Untreated binder | 10 mm wall treated binder | 15 mm wall Untreated binder | 15 mm wall treated binder |
| --- | --- | --- | --- | --- | --- | --- |
| Minutes | 7 minutes | 6.5 minutes | 9.5 minutes | 8 minutes | 13 minutes | 10 minutes |

The dome-shaped carbon block can be of any size with any wall thickness depending on the size of the gravity system containers. Sufficient carbon block wall thickness is necessary to increase contact time in order for the carbon block to adsorb all the volatile organic chemicals. In this invented carafe filter system, the size of the embodied dome-shaped carbon block is such that it fits into the upper portion of this embodied cartridge housing shell. Preferred wall thickness of the dome-shaped carbon block for this embodied carafe is 10 mm. With the preferred embodied dome-shaped carbon block with hydrophilic binder and carbon block wall thickness of 10 mm, acceptable flow is obtained in a carafe type filter. In this embodiment, the embodied dome-shaped carbon block is made of coconut shell based carbon powder with mesh size of 80×300, wherein 95% weight passes through 80 mesh and 10% passes through 200 mesh and 5% passes through 300 mesh. With the preferred wall thickness of 10 mm and using the preferred carbon powder mesh of 80×300, the nominal porosity of the carbon block is estimated to be 3 microns. The instant embodied dome-shaped carbon block with 10 mm wall thickness is capable of removing volatile organic chemicals and trapping most of the cysts in the carbon block. Lead reducing agents can be blended in the carbon and binder mix while making the carbon block, as an example of alternative treating chemicals.

It is understood that the thickness of the carbon block can be greater than 10 microns, if required for applications other than for a carafe pitcher wherein a larger unit than a pitcher is a gravity-fed unit. Such a unit may utilize a thicker porous carbon block, perhaps as much as 20 mm versus the 10 mm of the current application for carafe pitcher use.

Figure 2:
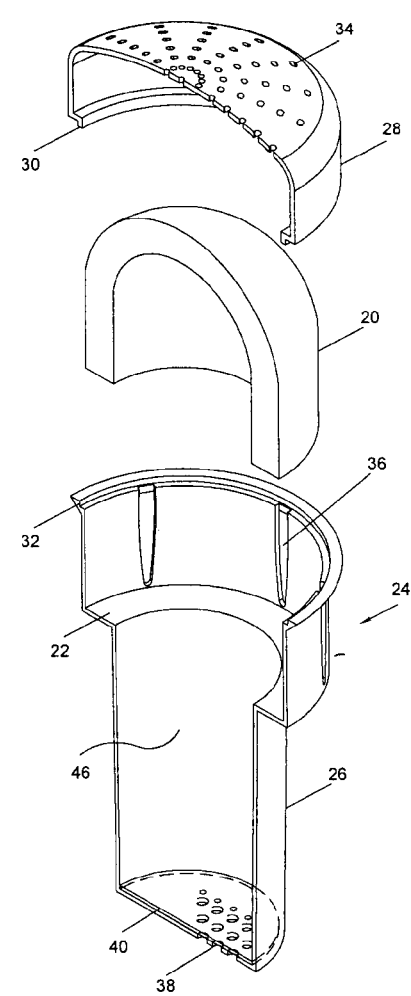
FIG. 2 is a partial perspective view of the structural components of FIG. 1.

The space below the carbon block in the cartridge shell can be used for ion exchange resin and other contaminates reducing agents. Water flows through the carbon block and through the ion exchange resin and other media in the tubular space into the outlet where the treated water is collected in the lower container. The water exit outlet holes are covered by a fine hydrophilic filter sheet having porosity of less than 2 microns.

to make it hydrophilic. This surface modification of the polymeric binder improves the water flow rate through the filter components. The hydrophilic surface, in conjunction with the thin wall of the dome-shaped carbon block, provides an improved flow rate. The above Table 1 illustrates the improved flow rate As illustrated in FIGS. 1-2, the filter cartridge 50 is of the general shape and form commonly used in a carafe type of gravity fed water filtration system. The filter cartridge comprises a dome-shaped carbon block 20, upper portion 24 and lower portion 26 of cartridge shell 25, a top cap 28, and hydrophilic filter sheet 40.

The filter cartridge cap 28 and filter cartridge shell 25 can be comprised of a suitable polymer including polypropylene (PP), low density polyethylene (LDPE) and high density polyethylene (HDPE) with glass fibers bonded therein for strength as is conventionally practiced.

The filter cartridge accordingly comprises a cartridge shell defining an upper portion and an upper interior volume, a lower portion and a lower interior volume, a top cap, a dome-shaped hydrophilic porous particulate filter carbon block having a dome-shaped closed upper end, and open lower end and sidewalls extending there between, the dome-shaped hydrophilic porous particulate filter defining an interior volume free from porous articulate media, a hydrophilic filter sheet of sub micron media disposed in the lower interior volume of the lower portion defined by said cartridge shell.

The carbon block 20 is of ultra high molecular weight polyethylene of three million molecular weight heated to bind activated carbon powder particulates by application of heat.

The application of controlled heat to the ultrahigh molecular weight polyethylene softens the polyethylene without melting, allows the incorporation of activated carbon powder particles and does not cover up the carbon surfaces. The preferred binder ultrahigh molecular weight polyethylene (UHMWPE) is manufactured by Ticono™, under the designation GUR™.

The dome shape of the carbon block provides a maximum surface treatment area for inlet subject water. The thickness of the walls of the dome shape has been determined by experiment to be within the range of from 3 to 10 mm thickness to provide suitable wall strength and an acceptable water flow rate. The ultra high molecular weight polyethylene of three million molecular weight provides structural strength to the walls of the dome-shaped carbon block for normal use and application as a filtration medium.

The embodied dome-shaped carbon block is made of coconut shell based carbon powder with mesh size of 80×300 and from 100×280 to 100×320. With the carbon mesh size of 100×320, the nominal pore size in the carbon block is in the range of 3 microns. A pore size of the range of 3 microns is suitable for removing particulate larger than 3 microns. A preferred coconut shell based carbon powder of mesh size 100×300 is capable of removing volatile organic chemicals and cysts in a carafe type of filter system as in the instant invention.

Cysts are not easily removed by conventional oxidizing agents. Common methods of removing cysts are to trap them in a filter that has porosity less than 2 microns. Such filters with porosity less than 2 microns typically have low water flow rates without auxiliary means to improve water flow rate or to provide water pressure to increase fluid flow rate.

The polymeric binder containing the activated carbon powder of this invention accordingly is surface modified after preparation of the dome-shaped carbon block of desired wall thickness. The surface modification comprises application of a hydrophilic additive to the surface of the dome-shaped carbon block. As noted above, the preferred additive is Monowet 70™, manufactured by Uniqema™ division of ICI™. The additive, upon application to a substrate, is not water-soluble and hence the surface modification of the polymeric binder containing the activated carbon particles stays hydrophilic for the life use of the carbon block.

The hydrophilic surface modified binder carbon block enables a higher water flow rate through the carbon block than obtained without the surface modification additive. Experimental data (Table 1) indicate the higher flow rate achieved with small pore size carbon powder block, carbon mesh size 100×320, with wall thickness of 10 mm, of a surface-modified activated carbon powder block.

As shown in FIG. 1, top cap 28 has a pattern of inlet holes 34 in the top surface of the cap for inflow of water to the filter cartridge. The pattern of inlet holes is such to facilitate the water flow with least restriction, the inlet holes being sized also for improved water flow. The shape of the top cap 28 is such to cover over the dome shape of the carbon block to provide a closed container over and around the carbon block when the top cap 28 is seated on step 22 of cartridge shell 25. Top cap 28 has an annular indented collar 30 on the top cap 28 vertical annular member that seats on the annular seating member 32 of cartridge shell 25 to provide a water seal obtained by the mating fit.

Cartridge shell 25 comprises an upper portion 24, which receives the dome-shaped carbon block 20 and the top cap 28 in mating placement. Lower portion 26 receives ion exchange resin 46 and other filtering media and a hydrophilic filter sheet 40. Water outlet holes 38 in the bottom surface of cartridge shell 25 are covered with filter sheet 40, which traps any cysts that might have escaped being trapped in the carbon block 20.

Upper portion 24 of cartridge shell 25 comprises an annular enclosure for carbon block 20 and provides water inlet channels 36 spaced around the inner circumference of upper portion 24 to provide means of water flow to the annular sides of carbon block 20 of water flowing down the vertical sides of carbon block 20 from the holes 34 in top cap 28. The number of channels 36 in the upright sides of upper portion 24 can be as many as eight or ten to ease rapid water flow. Upper portion 24 seats carbon block 20 on the annular projection step 22 which projects inward to provide support mounting for carbon block 20.

Lower portion 26 of cartridge shell 25 comprises chamber space 46, which is filled with ion exchange resin and other filtering media. Depending on the type of impurities in the feed, water, chamber space 46 can be filled with bacteria and virus removing media. One such bacteria and virus removing media is HaloPure™ beads, manufactured by Vanson Halosource Corporation.

Exit holes 38, in the bottom surface of lower portion 26 of cartridge shell 25, are covered by fine mesh hydrophilic filter sheet 40, the fine mesh hydrophilic sheet 40 having porosity of less than 2 microns. Hydrophilic filter sheet 40 acts as a buffer trap to prevent any cysts escaping that were not trapped in the filter block 20. Hydrophilic filter sheet 40 is over exit holes 38 and also prevents escape of the ion exchange resins and other contaminant reducing media into the exit water.

Activated carbon granules used in home purification devices are generally used to remove bad taste and odor. They are used to remove chlorine and other reactive chemicals dissolved in the water. Carbon blocks, used in this invention, of fine mesh powder of activated carbon, as compared to granular activated carbon, have enormous surface area enabling removal of volatile organic chemicals besides bad taste and odor. If the porosity of the carbon block is smaller than 2 microns it also is used to remove cysts.

Conventional carbon blocks are generally tubular in design, having a central hole. Water flows from the outer surface radially through the wall thickness into inner internal space of the conventional carbon block. For water to flow at an acceptable flow rate through the conventional carbon block, water must be forced through the thickness of the carbon block. Such systems are general used in homes with water line connection.

For cysts reduction, these carbon blocks need have porosity of less than 2 microns. However in a gravity filter system, particularly the carafe type of filter, conventionally shaped tubular carbon block with less than 2 microns will not have adequate gravity force to allow water flow.

In this invention, the carbon block used is not of the conventional design but is shaped like a dome wherein water flows from the top and sides of the dome into the inner internal space of the dome. The flow rate through the dome shape carbon block in the gravity filtration system is a function of water height in the top container, the wall thickness of the carbon block and the porosity of the carbon block.

In a carafe type of gravity filtration the water height pressure is less than 0.5 lbs/in sq. With this low pressure, a conventional shaped tubular carbon block is not practical for it will have unacceptable flow rate, particularly with a smaller porosity of 2 microns.

In this invention, a dome-shaped carbon block is used. The polymeric binder used in making this carbon block is surface modified to make it hydrophilic. Several types of polymeric binders, high-density polyethylene (HDPE), low-density polyethylene (LDPE), ultrahigh molecular weight polyethylene (UHMWPE), polypropylene (PP) and ethylene vinyl acetate copolymer (EVA) can be used in making carbon blocks.

As noted above, in this invention the preferred binder is GUR™, an ultrahigh molecular weight polyethylene (UHMWPE) manufactured by Ticona™. The polymeric binder is surface modified with Monowet 70™ manufactured by Uniqema™ division of ICI™. This surface modified hydrophilic binder increases the attractive force between the binder and water, decreasing the surface tension, allowing faster wetting and hence higher flow rate. Monowet 70™ is not water-soluble and hence the surface modification binder stays hydrophilic for the life use of the carbon block.

In this invention, the carbon block is designed in a shape of a dome giving higher surface area. Hydrophilic surface modified binder in the carbon block enables higher flow rate through the carbon block than without the surface modification. The higher flow rate is achieved even with small pore size carbon block. The dome-shaped carbon block can of any size with any wall thickness depending on the size of the gravity system containers.

FIG. 1 and FIG. 2 show two views of the exploded view of the preferred embodiment. Filter cartridge 50 is the general shape and form that is commonly used in carafe type of gravity filtration system. The dome-shaped carbon block 20 is glued on to step 22 in upper portion 24 of cartridge shell 25. Top cap 28 has mounting 30 that matches rim 32 on cartridge shell 25. Water to be filtered enters the filter cartridge from openings 34 in outer cap and through side slots 36 in upper portion 24 of cartridge shell 25. Filtered water exits out of the filter cartridge through exit openings 38. A hydrophilic filter media 40 with porosity of less than 2 microns covers the exit openings 38.

The dome-shaped carbon block 20 is adhesively connected onto step 22 in upper portion 24 of cartridge shell 25 to provide a seal to prevent water from flowing around the bottom of carbon block 20 and thus avoid the porous particulate filter carbon block 20. The adhesive connection is an adhesive material suitable for application in an aqueous environment.

In the assembled filter cartridge, carbon block 20 is enclosed within top cap 28 and upper portion 24 of cartridge shell 25. In use, carbon block 20 is within top cap 28 and upper portion 24 of cartridge shell 25 is beneath the upper container of the two-container gravity system. Water flows from lower portion 26 of cartridge shell 25 to the bottom container of the gravity system. Space 46 within lower portion 26 of cartridge shell 25 can be filled with ion exchange resins and other filtering media.

In use, unfiltered water in the top container of the two-container gravity system enters the filter cartridge through inlet holes 34 and 36. Water flows through the dome-shaped hydrophilic carbon block 20 into the ion exchange and other media in chamber 46 and exits out outlet 38. Depending on type of impurities in the feed water, chamber 46 can be filled with bacteria and virus removing media. One such bacteria and virus removing media is HaloPure™ beads, manufactured by Vanson Halosource Corp.

The preferred dome-shaped hydrophilic carbon block 20 removes VOC as tested to NSF 53 standards. Most of the cysts in the untreated water are trapped in the dome-shaped carbon block 20. Any cysts that do escape being trapped in the carbon block 20 are filtered out at exit openings 38 by 2-micron hydrophilic filter media 40. Filtered water exiting the filter cartridge has greater than 99.9% of 3 microns cysts removed with this system meeting NSF 53 standards.

Anyone familiar with the art will understand that the present invention is not limited to the preferred embodiment described above for the carafe filter system. Changes can be made to the shape and size of the carbon block depending on the size of the containers in the gravity system. Based on the level of contaminates in the untreated water, the carbon block can be covered by a sediment filter to trap suspended impurities. Again, based on the impurities, the size and shape of the media holding chamber in the cartridge can be changed to increase contact and dwell time as needed by bacteria and virus killing media.

What is claimed is:

1. A filter cartridge for a gravity-fed water treatment device, in combination, comprising:
   (a) a cartridge shell defining an upper portion and an upper interior volume and a lower portion, and a lower interior volume, a top cap, a dome-shaped hydrophilic porous particulate filter carbon block having a dome-shaped closed upper end, and open lower end and sidewalls extending there between, the dome-shaped hydrophilic porous particulate filter defining an interior volume free from porous particulate filter media, a hydrophilic filter sheet of sub micron media disposed in the lower interior volume of the lower portion defined by said cartridge shell,
   (b) an adhesive connection sealing said dome-shaped hydrophilic porous particulate filter carbon block to said upper portion of said cartridge shell in the lower end of said upper portion, and
   (c) wherein said filter cartridge is configured and arranged to receive an upper source of untreated water and to supply a lower container of treated water wherein said filter cartridge separates said upper source and said lower container to allow water to flow by force of gravity through said cap and said dome-shaped hydrophilic porous particulate filter carbon block through said interior volume free from porous particulate filter media and through said hydrophilic filter sheet, from said upper source to said lower container.

2. The filter cartridge of claim 1 wherein said dome-shaped hydrophilic porous particulate filter carbon block comprises a polymeric binder carbon block comprising an activated carbon powder and ultrahigh molecular weight polyethylene carbon block surface treated with an anionic surfactant wetting agent.

3. The ultrahigh molecular weight polyethylene of claim 2 wherein the molecular weight is three million molecular weight.

4. The polymeric binder carbon block of claim 2 comprising activated carbon powder and ultrahigh molecular weight polyethylene wherein said anionic surfactant wetting agent is diethylhexyl sodium sulfosuccinate.

5. The filter cartridge of claim 1 wherein wall thickness of said dome-shaped hydrophilic porous particulate filter carbon block is from 3 to 10 mm.

6. The filter cartridge of claim 1 wherein said dome-shaped hydrophilic porous particulate filter carbon block comprises a carbon block comprising activated carbon powder of mesh size 80×300 and ultrahigh molecular weight polyethylene.

7. The filter cartridge of claim 1 wherein said dome-shaped hydrophilic porous particulate filter carbon block comprises a carbon block comprising activated carbon powder of mesh size 100×280 and ultrahigh molecular weight polyethylene.

8. The filter cartridge of claim 1 wherein said dome-shaped hydrophilic porous particulate filter carbon block comprises a carbon block comprising activated carbon powder of mesh size 100×320 and ultrahigh molecular weight polyethylene.

9. The filter cartridge of claim 1 wherein wall thickness of said dome-shaped hydrophilic porous particulate filter carbon block is a uniform wall thickness minimum of 3 mm.

10. The filter cartridge of claim 1 wherein wall thickness of said dome-shaped hydrophilic porous particulate filter carbon block is a uniform wall thickness of up to 10 mm.

11. The filter cartridge of claim 1 wherein said hydrophilic filter sheet of sub micron media has a porosity of less than 2 microns.

12. The filter cartridge of claim 1 wherein interior volume of said lower portion of said cartridge shell is filled with ion exchange resins and other filtering media including bacteria and virus removing media.

13. The filter cartridge of claim 1 wherein water flows through dome-shaped hydrophilic porous particulate filter carbon block and into lower portion of said cartridge shell containing contaminants removal media and through sub micron filter sheet wherein sides of said filter shell of said filter cartridge contain water flow of said filter cartridge.

14. The filter cartridge of claim 1 wherein wall thickness of said dome-shaped hydrophilic porous particulate filter carbon block is a uniform wall thickness of up to 20 mm.

* * * * *